(12) United States Patent
Mukai

(10) Patent No.: US 10,112,609 B2
(45) Date of Patent: Oct. 30, 2018

(54) COLLISION AVOIDANCE APPARATUS

(71) Applicant: DENSO CORPORATION, Kariya, Aichi-pref. (JP)

(72) Inventor: Yasuhiko Mukai, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/468,349

(22) Filed: Mar. 24, 2017

(65) Prior Publication Data

US 2017/0203758 A1   Jul. 20, 2017

Related U.S. Application Data

(63) Continuation-in-part of application No. 14/734,097, filed on Jun. 9, 2015, now abandoned.

(30) Foreign Application Priority Data

Jun. 10, 2014  (JP) .................................. 2014-119704

(51) Int. Cl.
*B60W 30/09* (2012.01)
*F16H 59/66* (2006.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B62D 15/0265; G08G 1/16; G08G 1/165; G08G 1/167; G08G 1/163; B60T 8/17557;
(Continued)

(56) References Cited

U.S. PATENT DOCUMENTS 6,571,176 B1 * 5/2003 Shinmura ................. B60T 7/22
                                                    180/421
7,444,224 B2 * 10/2008 Sadano ............... B60T 8/17557
                                                    701/301
(Continued)

FOREIGN PATENT DOCUMENTS

JP        06-008747 A    1/1994
JP       2003-123185 A   4/2003
(Continued)

*Primary Examiner* — Yuri Kan
(74) *Attorney, Agent, or Firm* — Harness, Dickey & Pierce, P.L.C.

(57) ABSTRACT

A collision avoidance apparatus includes a control unit that is configured to perform a collision avoidance process. The control unit determines whether or not an object is present ahead of the own vehicle. When the control unit determines that an object ahead is present, the control unit determines whether or not there is a likelihood of a collision between the object ahead and the own vehicle and whether or not a corner is present ahead of the own vehicle. When the control unit determines that a corner is not present and when a predetermined collision avoidance condition is established, the control unit is capable of changing a travelling direction of the own vehicle to avoid collision between the object ahead and the own vehicle. When the control unit determines that a corner is present, the control unit does not perform a travelling direction change of the own vehicle.

11 Claims, 9 Drawing Sheets

(51) Int. Cl.
    *G01S 7/22*     (2006.01)
    *B60T 7/22*     (2006.01)
    *G08G 1/16*     (2006.01)
    *B60W 10/20*     (2006.01)
    *B60W 10/18*     (2012.01)
    *B62D 15/02*     (2006.01)
    *G01S 19/42*     (2010.01)
    *G01C 21/34*     (2006.01)

(52) U.S. Cl.
    CPC ..... *B62D 15/0265* (2013.01); *B60W 2420/42* (2013.01); *B60W 2420/52* (2013.01); *B60W 2510/18* (2013.01); *B60W 2510/20* (2013.01); *B60W 2550/10* (2013.01); *B60W 2710/18* (2013.01); *B60W 2710/20* (2013.01); *G01C 21/34* (2013.01); *G01S 19/42* (2013.01)

(58) Field of Classification Search
    CPC ......... B60T 7/22; G01S 7/22; G01C 21/3602; B60W 30/09; F16H 59/66; B60Q 9/005
    USPC ............ 701/41, 70, 80, 301; 340/475, 932.2
    See application file for complete search history.

(56) References Cited

U.S. PATENT DOCUMENTS

| | | | | |
|---|---|---|---|---|
| 2002/0049116 | A1* | 4/2002 | Shiiba | ............... F16H 59/66 |
| | | | | 477/97 |
| 2005/0143895 | A1 | 6/2005 | Kato | |
| 2008/0243389 | A1* | 10/2008 | Inoue | ................... G08G 1/165 |
| | | | | 701/301 |
| 2010/0253542 | A1* | 10/2010 | Seder | ....................... G01S 7/22 |
| | | | | 340/932.2 |
| 2011/0043635 | A1 | 2/2011 | Fujita et al. | |
| 2011/0130936 | A1* | 6/2011 | Noda | ..................... G08G 1/163 |
| | | | | 701/70 |
| 2012/0062743 | A1* | 3/2012 | Lynam | ................. B60Q 9/005 |
| | | | | 348/148 |
| 2012/0218412 | A1* | 8/2012 | Dellantoni | ......... G01C 21/3602 |
| | | | | 348/148 |
| 2013/0030691 | A1 | 1/2013 | Sumizawa et al. | |
| 2014/0368330 | A1* | 12/2014 | Watanabe | ................ G08G 1/16 |
| | | | | 340/475 |

FOREIGN PATENT DOCUMENTS

| | | |
|---|---|---|
| JP | 2003-182544 A | 7/2003 |
| JP | 2005-186813 A | 7/2005 |
| JP | 2008-250879 A | 10/2008 |
| JP | 2008-260390 A | 10/2008 |
| JP | 2009-151522 A | 7/2009 |
| JP | 2010-015450 A | 1/2010 |
| JP | 2010-097400 A | 4/2010 |
| JP | 2011-063225 A | 3/2011 |
| JP | 2011-137730 A | 7/2011 |
| JP | 2013-082382 A | 5/2013 |
| JP | 2013-249002 A | 12/2013 |
| WO | WO-2009/107210 A1 | 9/2009 |

\* cited by examiner

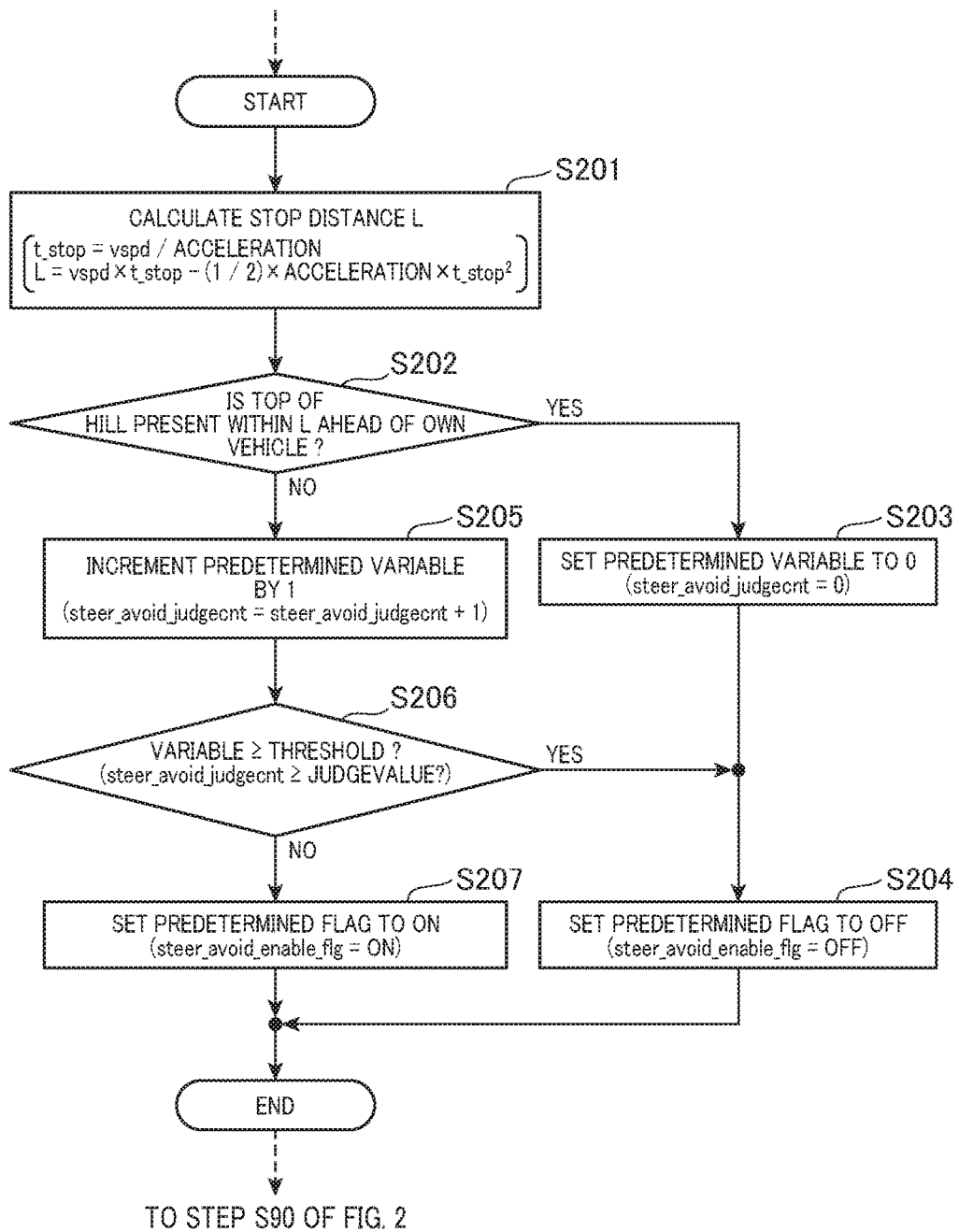

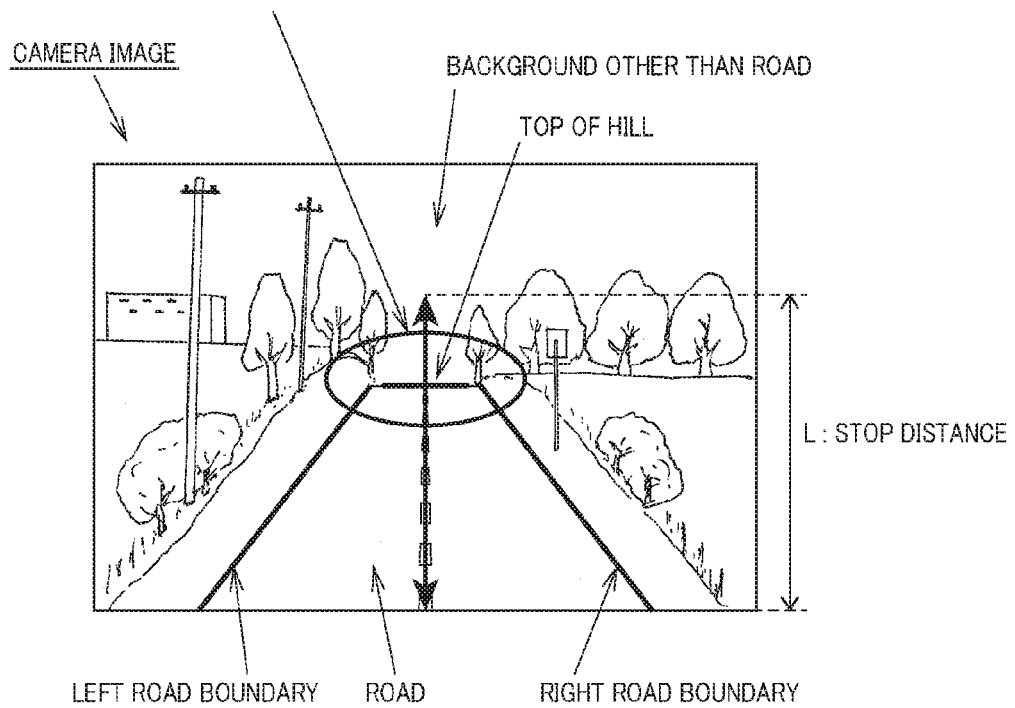

COLLISION AVOIDANCE APPARATUS

CROSS-REFERENCE TO RELATED APPLICATION

This application is a continuation-in-part of U.S. patent application Ser. No. 14/734,097, filed Jun. 9, 2015, which is based on and claims the benefit of priority from Japanese Patent Application No. 2014-119704, filed Jun. 10, 2014, the disclosure of which is incorporated herein in its entirety by reference.

BACKGROUND

Technical Field

The present disclosure relates to a collision avoidance apparatus that controls an own vehicle to avoid collision with an object that is present ahead of the own vehicle.

Related Art

A vehicle control apparatus that automatically brakes an own vehicle by controlling the brakes to avoid a collision with an object ahead that is positioned ahead of the own vehicle is conventionally known (refer to, for example, JP-2013-249002).

To avoid a collision between the own vehicle and an object ahead, in addition to stopping the own vehicle by brake control before the own vehicle collides with the object ahead, changing the travelling direction of the own vehicle by steering control is also effective.

However, even if the collision with the object ahead can be avoided as a result of the travelling direction of the own vehicle being changed, the own vehicle runs the risk of veering into an opposing lane.

SUMMARY

It is thus desired to suppress the occurrence of a situation in which the own vehicle veers into an opposing lane to avoid a collision.

A first exemplary embodiment provides a collision avoidance apparatus that is mounted to an own vehicle and which controls the own vehicle to avoid a collision between the own vehicle and an object ahead that is an object present ahead of the travelling own vehicle. The collision avoidance apparatus includes detection means, first collision avoidance means, corner determination means, and first prohibition means.

The detection means detects an object ahead. When the detection means detects an object ahead, the first collision avoidance means changes a travelling direction of the own vehicle to avoid collision between the object ahead and the own vehicle if a predetermined collision avoidance condition is established. The collision avoidance condition indicates that the own vehicle is in a state in which a travelling direction of the own vehicle is required to be changed.

The corner determination means determines whether or not a corner is present ahead on a road on which the own vehicle is travelling. When the corner determination means determines that the corner is present, the first prohibition means prohibits the first collision avoidance means from changing the travelling direction.

In the first exemplary embodiment, when a corner is present ahead on the road on which the own vehicle is travelling, changing of the travelling direction of the own vehicle to avoid collision with an object ahead is prohibited.

The own vehicle tends to more easily veer into an opposing lane as a result of the travelling direction of the vehicle being changed to avoid collision with an object ahead when a corner is present ahead, compared to when a corner is not present ahead. Therefore, according to the first exemplary embodiment, the occurrence of a situation in which the own vehicle veers into an opposing lane as a result of the travelling direction of the own vehicle being changed to avoid collision can be suppressed.

A second exemplary embodiment provides a collision avoidance apparatus that is mounted to an own vehicle and which controls the own vehicle to avoid collision with an object that is present ahead of the own vehicle. The collision avoidance apparatus includes a control unit that is configured to perform a collision avoidance process. The collision avoidance process includes: (i) determining whether or not an object is present ahead of the own vehicle; (ii) when the control unit determines that an object ahead is present, determining whether or not there is a likelihood of a collision between the object ahead and the own vehicle and whether or not a corner is present ahead of the own vehicle; and (iii) when the control unit determines that a corner is not present and when a predetermined collision avoidance condition is established, being capable of changing a travelling direction of the own vehicle to avoid collision between the object ahead and the own vehicle, the predetermined collision avoidance condition indicating that the own vehicle is in a state in which a travelling direction of the own vehicle is required to be changed. When the control unit determines that a corner is present, the control unit does not perform a travelling direction change of the own vehicle.

A third exemplary embodiment provides a collision avoidance method including: (i) detecting an object ahead; (ii) when the object ahead is detected, changing, by a collision avoidance apparatus, a travelling direction of the own vehicle to avoid collision between the object ahead and the own vehicle if a predetermined collision avoidance condition is established; (iii) determining whether or not a corner is present ahead on a road on which the own vehicle is travelling if a predetermined collision avoidance condition is established; and (iv) when it is determined that the corner is present, prohibiting the collision avoidance apparatus from changing a travelling direction of the own vehicle.

In the second and third exemplary embodiments, when a corner is present ahead on the road on which the own vehicle is travelling, changing of the travelling direction of the own vehicle to avoid collision with an object ahead is prohibited.

The own vehicle tends to more easily veer into an opposing lane as a result of the travelling direction of the vehicle being changed to avoid collision with an object ahead when a corner is present ahead, compared to when a corner is not present ahead. Therefore, according to the second and third exemplary embodiments, the occurrence of a situation in which the own vehicle veers into an opposing lane as a result of the travelling direction of the own vehicle being changed to avoid collision can be suppressed.

A fourth exemplary embodiment provides a collision avoidance apparatus that is mounted to an own vehicle and which controls the own vehicle to avoid collision with an object that is present ahead of the own vehicle. The collision avoidance apparatus includes a control unit that is configured to perform a collision avoidance process. The collision avoidance process includes: (i) determining whether or not an object is present ahead of the own vehicle; (ii) when the control unit determines that an object ahead is present, determining whether or not there is a likelihood of a collision between the object ahead and the own vehicle and whether or not a top of a hill is present ahead of the own vehicle; and (iii) when the control unit determines that a top of a hill is not present and when a predetermined collision avoidance condition is established, being capable of changing a travelling direction of the own vehicle to avoid collision between the object ahead and the own vehicle, the predetermined collision avoidance condition indicating that the own vehicle is in a state in which a travelling direction of the own vehicle is required to be changed. When the control unit determines that a top of a hill is present, the control unit does not perform a travelling direction change of the own vehicle.

A fifth exemplary embodiment provides a collision avoidance method including: (i) detecting an object ahead; (ii) when the object ahead is detected, changing, by a collision avoidance apparatus, a travelling direction of the own vehicle to avoid collision between the object ahead and the own vehicle if a predetermined collision avoidance condition is established; (iii) determining whether or not a top of a hill is present ahead on a road on which the own vehicle is travelling; and (iv) when it is determined that a top of a hill is present, prohibiting the collision avoidance apparatus from changing a travelling direction of the own vehicle.

In the fourth and fifth exemplary embodiments, when a top of hill is present ahead on the road on which the own vehicle is travelling, changing of the travelling direction of the own vehicle, to avoid collision with an object ahead is prohibited.

The own vehicle tends to more easily veer into an opposing lane as a result of the travelling direction of the vehicle being changed to avoid collision with an object ahead when a top of hill is present ahead, compared to when a top of hill is not present ahead. Therefore, according to the fourth and fifth exemplary embodiments, the occurrence of a situation in which the own vehicle veers into an opposing lane as a result of the travelling direction of the own vehicle being changed to avoid collision can be suppressed.

BRIEF DESCRIPTION OF THE DRAWINGS

In the accompanying drawings:

FIG. 9 is a flowchart showing a collision avoidance process according to a second embodiment; and FIG. 10 is a diagram showing a top of hill that is present ahead of the own vehicle according to one modification of the second embodiment.

DESCRIPTION OF EMBODIMENTS

Embodiments of the present disclosure will hereinafter be described with reference to the drawings.

(First Embodiment)

Figure 1:
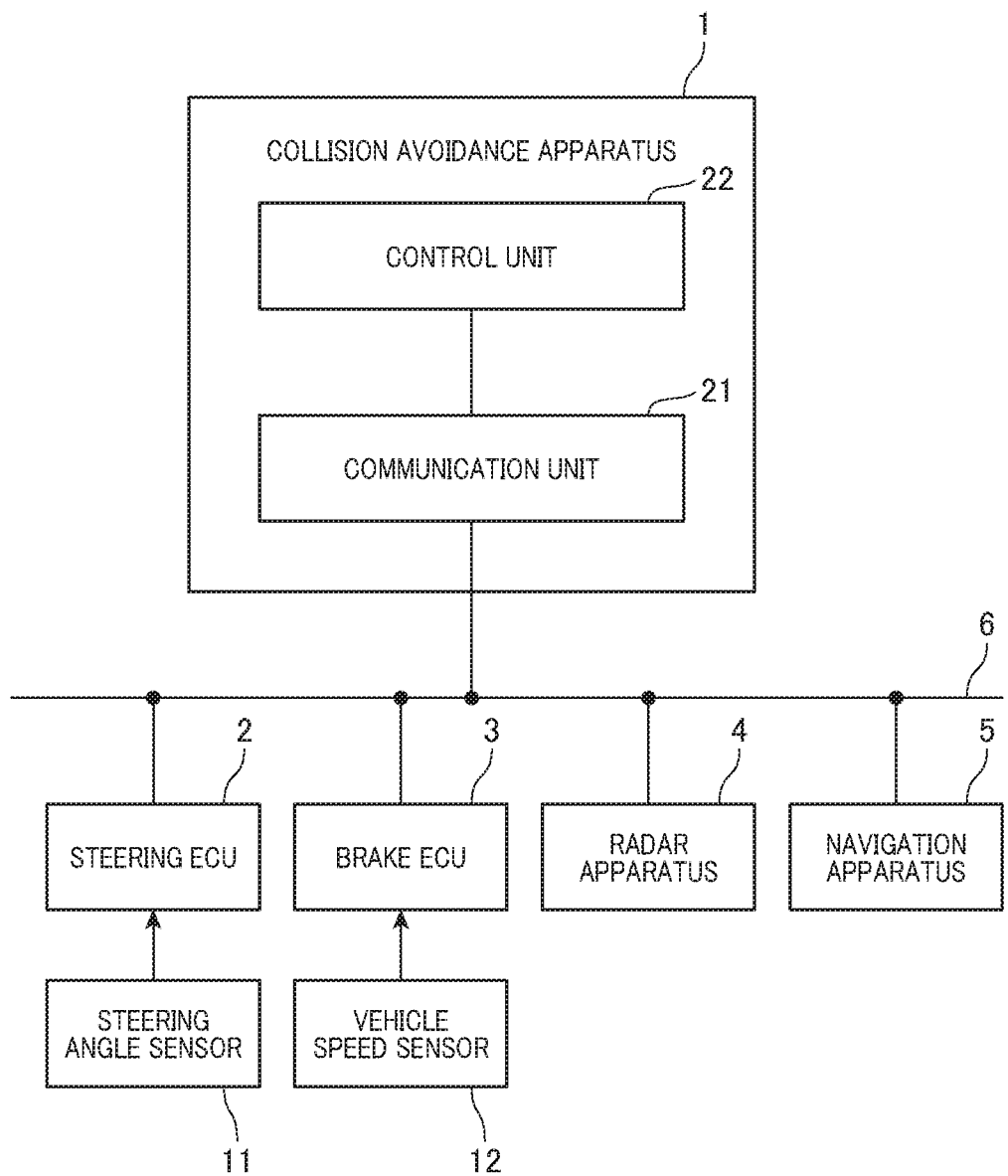
FIG. 1 is a block diagram showing a configuration of a collision avoidance apparatus according to a first embodiment and apparatuses connected to the collision avoidance apparatus.

A first embodiment will be described with reference to FIGS. 1 to 8. A collision avoidance apparatus 1 according to the present embodiment is mounted in a vehicle and, as shown in FIG. 1, is connected to a steering electronic control unit 2, a brake electronic control unit 3, a radar apparatus 4, and a navigation apparatus 5 by a communication line 6 such as to be capable of data communication with each component. The vehicle to which the collision avoidance apparatus 1 is mounted is referred to, hereafter, as an own vehicle. In addition, the steering electronic control unit 2 is referred to as a steering ECU 2 and the brake electronic control unit 3 is referred to as a brake ECU 3.

The steering ECU 2 performs power steering control in which assistance power is generated when the steering angle of a steering wheel is changed, based on detection signals from a steering angle sensor 11 that detects the steering angle of the front wheels during steering operation by the driver.

In addition, the steering ECU 2 controls the steering angle by driving a steering motor (not shown) that provides steering force to a steering system (e.g., a steering shaft), based on steering control data (such as the change amount of the steering angle) transmitted from the collision avoidance apparatus 1 via the communication line 6.

The brake ECU 3 performs anti-lock braking system (ABS) control, traction control, and the like, based on detection signals from a master cylinder pressure sensor (not shown) that detects a brake operation amount based on the hydraulic pressure in the master cylinder which pumps brake oil, and a vehicle speed sensor 12 that detects the travelling speed of the own vehicle.

In addition, the brake ECU 3 controls braking force by driving a brake actuator (not shown), based on brake control data (such as the deceleration) transmitted from the collision avoidance apparatus 1 via the communication line 6.

The radar apparatus 4 transmits radar waves ahead of the own vehicle and receives reflected radar waves, thereby detecting the position of an object present ahead of the own vehicle.

The navigation apparatus 5 acquires map data from a map storage medium in which road map data and various types of information are recorded, and detects the current position of the own vehicle based on global positioning system (GPS) signals received via a GPS antenna (not shown) and the like.

In addition, the navigation apparatus 5 performs control to display the current position of the own vehicle on a display screen, control to provide guidance on a route from the current position to a destination, and the like.

The collision avoidance apparatus 1 includes a communication unit 21 and a control unit 22.

The communication unit 21 transmits and receives data to and from the apparatuses connected to the communication line 6, based on a communication protocol (such as the controller area network (CAN) communication protocol) set in advance.

The control unit 22 is configured mainly by a known microcomputer that is composed of a central processing unit (CPU), a read-only memory (ROM), a random access memory (RAM), an input/output (I/O), a bus line that connects these components, and the like. The control unit 22 performs various processes based on programs stored in the ROM.

In the collision avoidance apparatus 1 configured as described above, the control unit 22 performs a collision avoidance process. The collision avoidance process is repeatedly performed at an execution cycle (such as every 50 ms, according to the present embodiment) set in advance, while the control unit 22 is operating.

Figure 2:
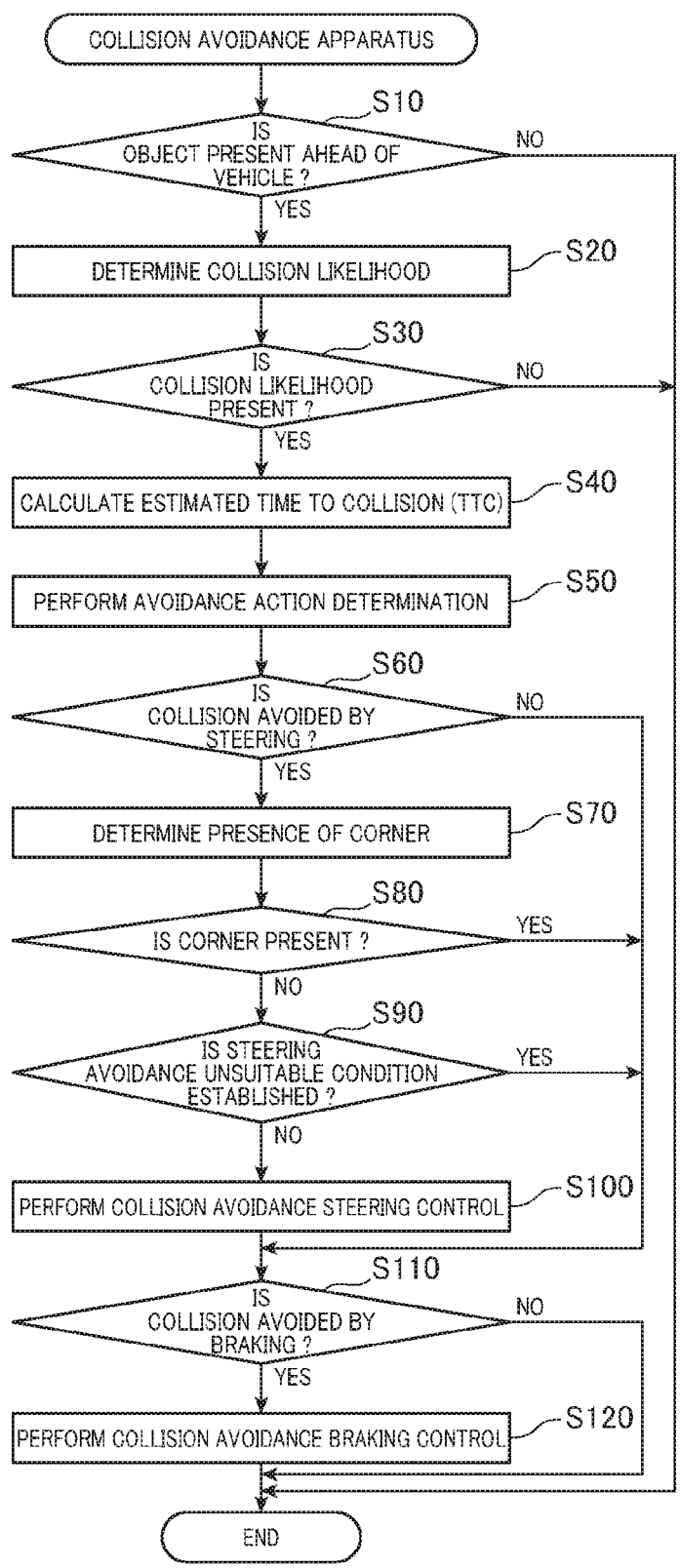
FIG. 2 is a flowchart showing a collision avoidance process.

When the collision avoidance process is performed, as shown in FIG. 2, first, at step S10, the control unit 22 determines whether or not an object (referred to, hereafter, as an object ahead) is present ahead of the own vehicle, based on the detection results from the radar apparatus 4.

Here, when determined that an object ahead is not present (NO at step S10), the control unit 22 temporarily terminates the collision avoidance process. Meanwhile, when determined that an object ahead is present (YES at step S10), at step S20, the control unit 22 determines whether or not there is a likelihood of a collision between the object ahead and the own vehicle (referred to, hereafter, as an own vehicle collision likelihood).

Figure 3:
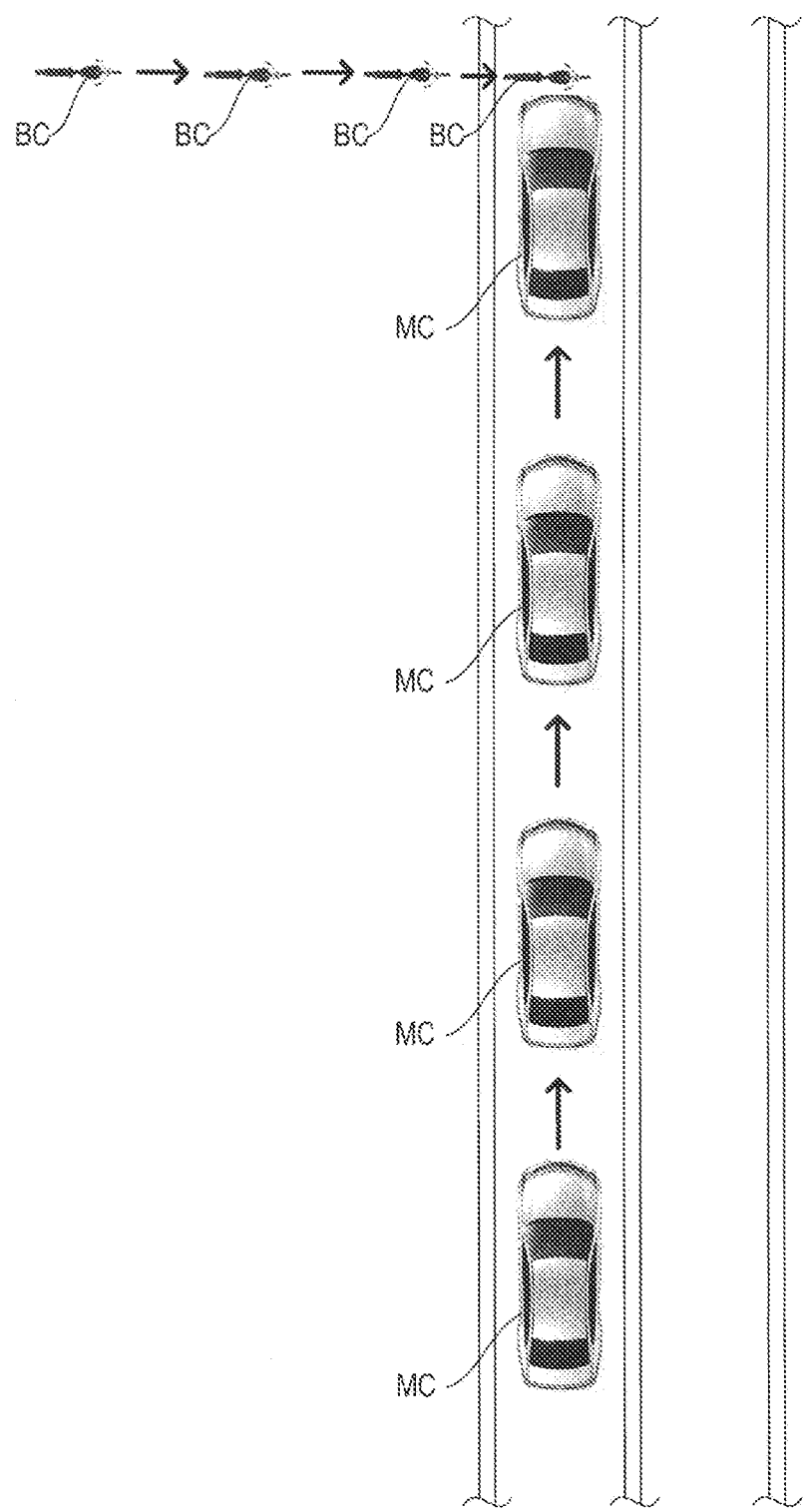
FIG. 3 is a diagram showing a situation in which a bicycle is about to run out in front of a travelling own vehicle.

Here, a method by which the control unit 22 determines whether or not there is an own vehicle collision likelihood will be described using, for example, a situation in which a bicycle BC is about to run out in front of a travelling own vehicle MC from the left side of the own vehicle MC, as shown in FIG. 3.

Figure 4:
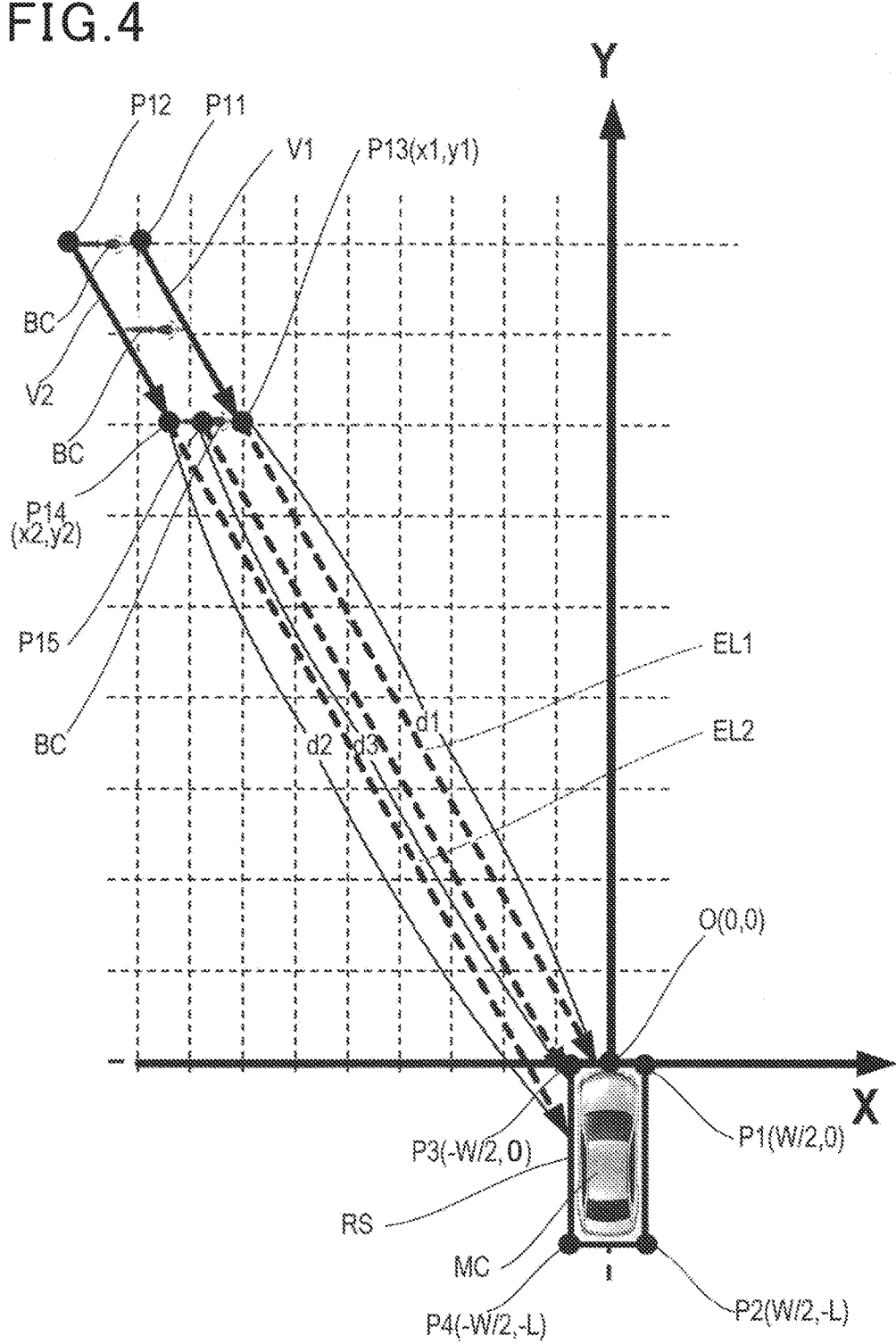
FIG. 4 is a diagram showing a method for determining an own vehicle collision likelihood.

First, as shown in FIG. 4, the control unit 22 sets a two-dimensional orthogonal coordinate system in which the front/back direction of the own vehicle is the Y-axis, the direction perpendicular to the front/back direction of the own vehicle is the X-axis, and the center front-end portion of the own vehicle is the point of origin O (the coordinates being (0,0)).

Here, when the overall width of the own vehicle is W and the overall length of the own vehicle is L, the area in which the own vehicle is present is a rectangle RS of which the vertices are point P1 having the coordinates (W/2,0), point P2 having the coordinates (W/2,−L), point P3 having the coordinates (−W/2,0), and point P4 having the coordinates (−W/2,−L).

The control unit 22 then calculates relative speed vectors at the right end portion and the left end portion of the bicycle BC, based on the detection results from the radar apparatus 4 obtained during the previous collision avoidance process, and the detection results from the radar apparatus 4 obtained during the current collision avoidance process. For example, the positions of the right end portion and the left end portion of the bicycle BC during the previous collision avoidance process are P11 and P12, respectively.

In addition, the positions of the right end portion and the left end portion of the bicycle BC during the current collision avoidance process are P13 and P14, respectively. In this case, a relative speed vector V1 at the right end portion of the bicycle BC is calculated by subtracting the coordinate values of point P11 from the coordinate values of point P13. In a similar manner, a relative speed vector V2 at the left end portion of the bicycle BC is calculated by subtracting the coordinate values of point P12 from the coordinate values of point P14.

Then, when the rectangle RS indicating the area in which the own vehicle is present is positioned on an extension line EL1 of the relative speed vector V1 of which the starting point is point P13 which indicates the current position of the right end portion of the bicycle BC, the control unit 22 determines that there is an own vehicle collision likelihood.

Specifically, first, the control unit 22 calculates the intersection between the extension line EL1 of the relative speed vector V1 of which the starting point is the right end portion of the bicycle BC, and the X-axis.

Here, when the coordinates of the right end portion (point P13) of the bicycle BC are (x1,y1) and the slope of the relative speed vector V1 is a(=dy/dx), the extension line EL1 is expressed by following expression (1).

$$y = ax(x - x1) + y1 \quad (1)$$

Therefore, as indicated in following expression (2), the value of x when y=0 in expression (1) is the x-coordinate value of the intersection with the X-axis.

$$0 = ax(x - x1) + y1 \quad (2)$$

Based on expression (2), the x-coordinate value of the intersection with the X-axis is expressed by following expression (3).

$$x = -y1/a + x1 \quad (3)$$

When the x-coordinate value is within a range that is greater than −W/2 and less than +W/2, the control unit 22 determines that there is an own vehicle collision likelihood.

A distance d1 (referred to, hereafter, as a right end portion collision distance d1) between the right end portion (in other words, point P13) of the bicycle BC and the intersection with the own vehicle MC (in other words, the rectangle RS) is expressed by following expression (4).

$$d1 = \{y1^2 + (y1/a)^2\}^{-1/2} = (1 + 1/a)^{-1/2}xy1 \quad (4)$$

Furthermore, the control unit 22 calculates the intersection between the extension line EL1 of the relative speed vector V1 of which the starting point is the right end portion of the bicycle BC, and the left side of the rectangle RS.

As indicated in following expression (5), the value of y when x=−W/2 in expression (1) is the y-coordinate value of the intersection with the left side of the rectangle RS.

$$y = ax(-W/2 - x1) + y1 \quad (5)$$

When the y-coordinate value is within a range that is greater than −L and less than 0, the control unit 22 determines that there is an own vehicle collision likelihood.

The right end portion collision distance d1 in this case is expressed by following expression (6).

$$d1 = [(x1 + w/2)^2 + \{2xy1 + a(w/2 - x1)\}^2]^{-1/2} \quad (6)$$

Next, the control unit 22 also calculates the intersection with the X-axis and the intersection with the left side of the rectangle RS, of an extension line EL2 of the relative speed vector V2 of which the starting point is the left end portion of the bicycle BC, in a manner similar to those of the extension line EL1, thereby determining the own vehicle collision likelihood. In addition, when determined that there is an own vehicle collision likelihood, the control unit 22 calculates a distance d2 (referred to, hereafter, as a left end portion collision distance d2) between the left end portion (in other words, point P14) of the bicycle BC and the intersection with the own vehicle MC, in a manner similar to that of the extension line EL1.

Figure 5:
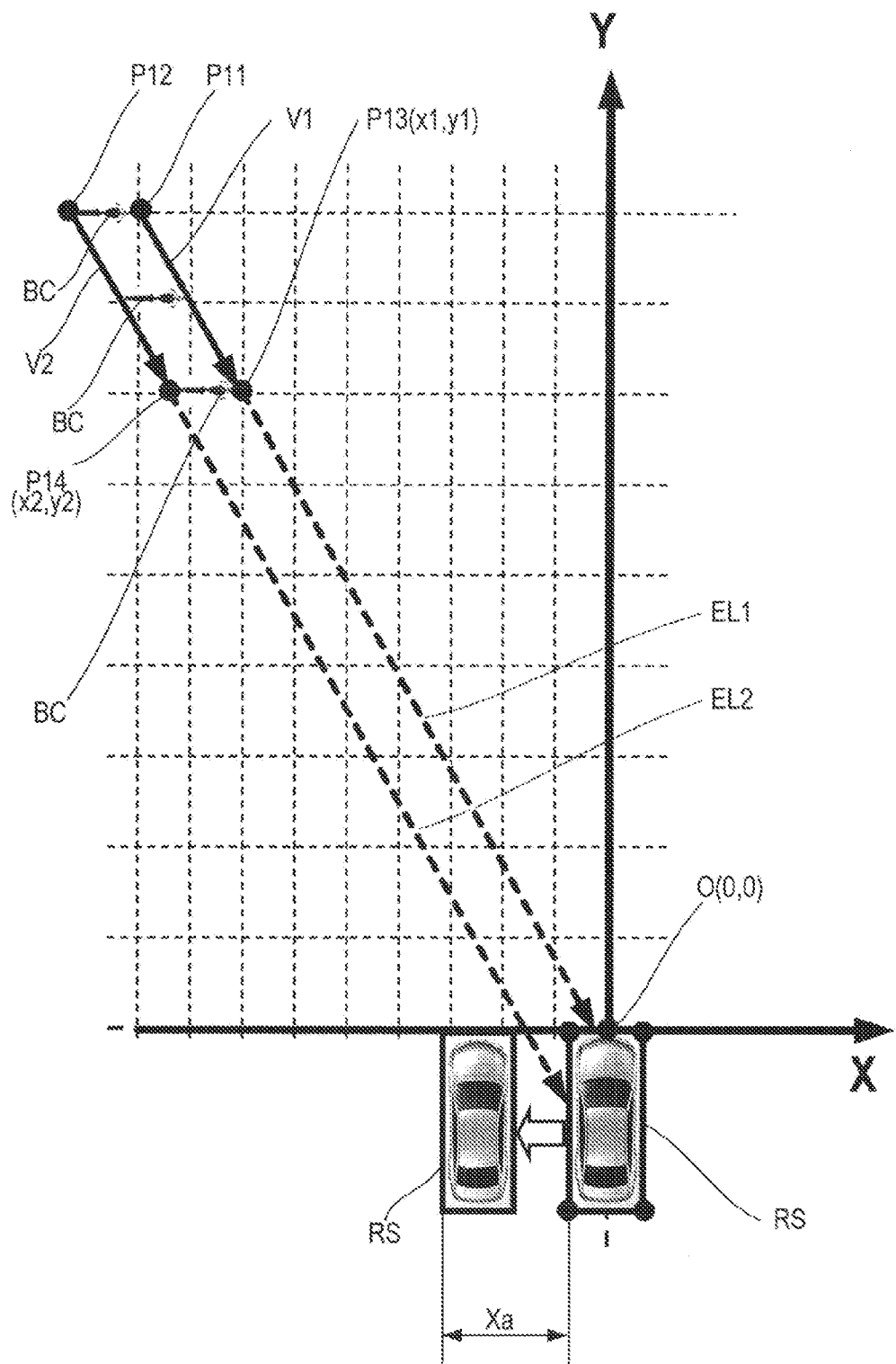
FIG. 5 is a diagram showing a method for calculating a lateral direction avoidance amount.

In addition, when determined that there is an own vehicle collision likelihood, as shown in FIG. 5, the control unit 22 calculates a movement amount (referred to, hereafter, as a lateral direction avoidance amount Xa) by which the rectangle RS is moved along the X-axis direction, such that the extension lines EL1 and EL2 do not intersect with the rectangle RS.

Then, after completing the process at step S20, as shown in FIG. 2, at step S30, the control unit 22 determines whether or not there is an own vehicle collision likelihood based on the determination result at step S20. Here, when determined that there is no own vehicle collision likelihood (NO at step S30), the control unit 22 temporarily ends the collision avoidance process. Meanwhile, when determined that there is an own vehicle collision likelihood (YES at step S30), at step S40, the control unit 22 calculates an estimated time to collision TTC.

Here, a method by which the control unit 22 calculates the estimated time to collision will be described using, for example, the situation in which the bicycle BC is about to run out in front of the travelling own vehicle MC from the left side of the own vehicle MC, as shown in FIG. 3.

First, as shown in FIG. 4, the control unit 22 calculates the right end portion collision distance d1, the left end portion collision distance d2, and a center portion collision distance d3. The control unit 22 has already calculated the right end portion collision distance d1 and the left end portion collision distance d2 in the process at step S20. The center portion collision distance d3 refers to the distance (see distance d3 in FIG. 4) between the center portion (see point P15 in FIG. 4) of the bicycle BC and the intersection with the own vehicle MC (in other words, the rectangle RS). At step S40, the control unit 22 calculates the center portion collision distance d3 by a method similar to those for the right end portion collision distance d1 and the left end portion collision distance d2.

Furthermore, the control unit 22 calculates the speed $V_B$ of the bicycle BC by following expression (7).

$$V_B = \{(dx/dt)^2 + (dy/dt)^2\}^{-1/2} \quad (7)$$

Then, the control unit 22 calculates an estimated time to collision TTC1 of the right end portion of the bicycle BC, an estimated time to collision TTC2 of the left end portion of the bicycle BC, and an estimated time to collision TTC3 of the center portion of the bicycle BC by following expressions (8), (9), and (10).

$$TTC1 = d1/V_B \quad (8)$$

$$TTC2 = d2/V_B \quad (9)$$

$$TTC3 = d3/V_B \quad (10)$$

Then the control unit 22 sets the shortest of the estimated times to collision TTC1, TTC2, and TTC3 as the estimated time to collision TTC.

After completing the process at step S40, as shown in FIG. 2, at step S50, the control unit 22 performs determination of avoidance action based on the estimated time to collision TTC and the travelling speed V of the own vehicle (referred to, hereafter, as own vehicle speed V).

Figure 6:
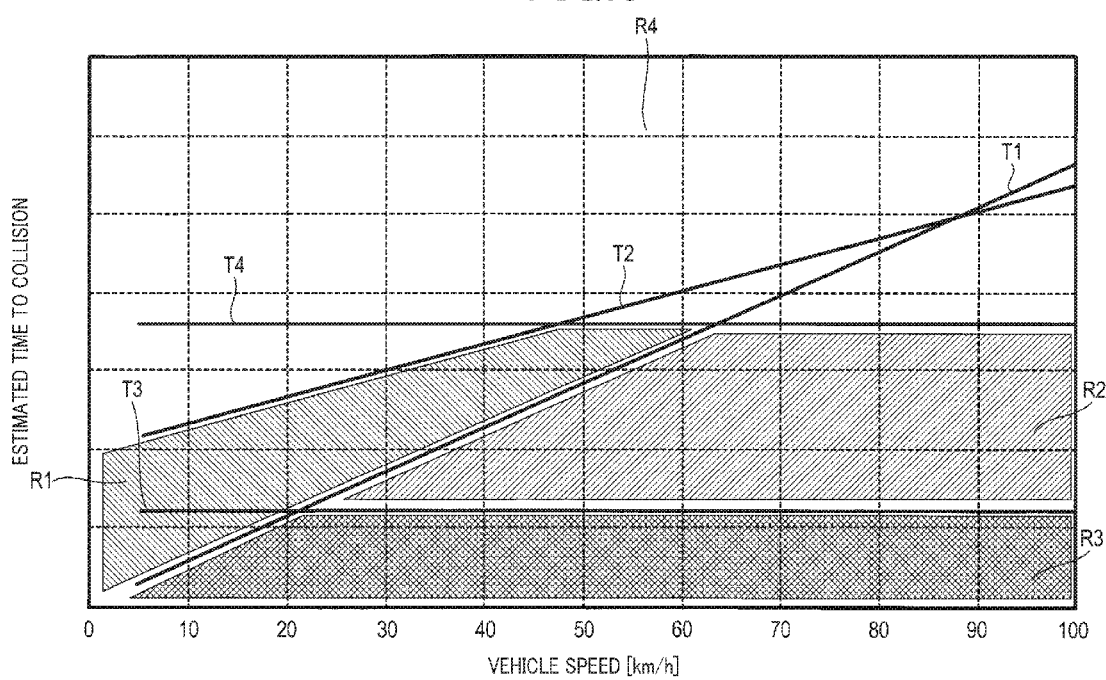
FIG. 6 is a diagram showing a method for determining avoidance action.

Specifically, as shown in FIG. 6, classification is made into a region R1 (referred to, hereafter, as a braking avoidance region R1) in which a collision is avoided by braking, a region R2 (referred to, hereafter, as a braking/steering avoidance region R2) in which a collision is avoided by steering and braking, a region R3 (referred to, hereafter, as a reduction region R3) in which collision damage is reduced by braking, and a region R4 (referred to, hereafter as an no-assistance region R4) in which avoidance assistance by the collision avoidance apparatus 1 is not performed, based on the estimated time to collision TTC and the own vehicle speed V.

The regions R1, R2, R3, and R4 are decided in advance based on a braking avoidance limit time T1, a normal braking avoidance lower limit time T2, a steering avoidance limit time T3, and a normal steering avoidance lower limit time T4.

The braking avoidance limit time T1 refers the minimum estimated time to collision at which a collision between the own vehicle and the object ahead can be avoided by activating the brakes, and is proportional to the relative speed to the object ahead. In other words, when the driver starts braking operation under a condition in which the estimated time to collision TTC is less than the braking avoidance limit time T1, the collision with the object ahead cannot be avoided by only the braking operation.

The normal braking avoidance lower limit time T2 refers to the minimum estimated time to collision at which the driver of the own vehicle starts the braking operation to avoid collision between the own vehicle and the object ahead, and is proportional to the relative speed to the object ahead.

The steering avoidance limit time T3 refers to the minimum estimated time to collision at which a collision between the own vehicle and the object ahead can be avoided by a steering operation, and is a fixed value independent of the relative speed to the object ahead. In other words, when the driver starts the steering operation under a condition in which the estimated time to collision TTC is less than the steering avoidance limit time T3, the collision with the object ahead cannot be avoided by only the steering operation.

The normal steering avoidance lower limit time T4 refers to the minimum estimated time to collision at which the driver of the own vehicle starts the steering operation to avoid collision between the own vehicle and the object ahead, and is a fixed value independent of the relative speed to the object ahead.

The braking avoidance region R1 is a region that is the braking avoidance limit time T1 or more, less than the normal braking avoidance lower limit time T2, and less than the normal steering avoidance lower limit time T4.

The braking/steering avoidance region R2 is a region that is less than the braking avoidance limit time T1, the steering avoidance limit time T3 or more, and less than the normal steering avoidance lower limit time T4.

The reduction region R3 is a region that is less than the braking avoidance limit time T1 and is less than the steering avoidance limit time T3.

The no-assistance region R4 is any region other than the regions R1, R2, and R3.

Then, at step 50, when determined that the current state of the own vehicle is included in the braking avoidance region R1 or the reduction region R3 based on the estimated time to collision TTC and the own vehicle speed V, the control unit 22 determines that the own vehicle is in a state in which collision is avoided by braking. In addition, when determined that the current state of the own vehicle is included in the braking/steering avoidance region R2, the control unit 22 determines that the own vehicle is in a state in which collision is avoided by braking and steering. Furthermore, when determined that the current state of the own vehicle is included in the no-assistance region R4, the control unit 22 determines that the own vehicle is in a state in which an avoidance action is not taken.

Then, after completing the process at step S50, as shown in FIG. 2, at step S60, the control unit 22 determines whether or not the own vehicle is in a state in which collision can be avoided by steering, based on the determination result at step S50. Here, when determined that the own vehicle is not in a state in which collision can be avoided by steering (NO at step S60), the control unit 22 proceeds to step S110. Meanwhile, when determined that the own vehicle is in a state in which collision can be avoided by steering (YES at step S60), at step S70, the control unit 22 determines whether or not a corner is present in the position at which the own vehicle avoids the object ahead by steering.

Specifically, first, the control unit 22 calculates a distance D [m] over which the own vehicle moves until the own vehicle comes to a complete stop, based on the current own vehicle speed v0 [m/s] and the deceleration a0 [m/s$^2$] of the own vehicle when the brakes are operated, by following expression (11).

$$D = v0 \times t0 - a0 \times t0^2/2 \qquad (11)$$

Furthermore, the control unit 22 acquires road information (curvature of the road, according to the present embodiment) at distance D [m] ahead from the navigation apparatus 5. When determined that the acquired curvature is equal to or greater than a corner determination value set in advance, the control unit 22 determines that a corner is present.

Then, after completing the process at step S70, at step S80, the control unit 22 determines whether or not a corner is present at the position at which the own vehicle avoids the object ahead by steering, based on the determination result at step S70. Here, when determined that the corner is present (YES at step S80), the control unit 22 proceeds to step S110. Meanwhile, when determined that a corner is not present (NO at step S80), at Step S90, the control unit 22 determines whether or not a steering avoidance unsuitable condition that is set in advance is established.

The steering avoidance unsuitable condition is, for example, a residence being present ahead near the road on which the own vehicle is travelling, or the difference in elevation between the road and outside of the road being significant ahead on the road on which the own vehicle is travelling. At step S90, the control unit 22 determines whether or not the steering avoidance unsuitable condition is established using the road map data acquired from the navigation apparatus 5.

Here, when determined that the steering avoidance unsuitable condition is established (YES at step S90), the control unit 22 proceeds to step S110. Meanwhile, when determined that the steering avoidance unsuitable condition is not established (NO at step S90), at step S100, the control unit 22 makes the steering ECU 2 perform collision avoidance steering control to move the own vehicle, by steering, by a lateral direction avoidance amount Xa in the lateral direction at the estimated time to collision TTC to avoid collision, and proceeds to step S110.

Then, after proceeding to step S110, the control unit 22 determines whether or not the own vehicle is in a state in which collision is avoided by braking, based on the determination result at step S50. Here, when determined that the own vehicle is not in a state in which collision is avoided by braking (NO at step S110), the control unit 22 temporarily terminates the collision avoidance process. Meanwhile, when determined that the own vehicle is in a state in which collision is avoided by braking (YES at step S110), at step S120, the control unit 22 makes the brake ECU 3 perform collision avoidance brake control to brake the own vehicle at a deceleration set in advance to avoid collision, and then temporarily terminates the collision avoidance process.

In the collision avoidance apparatus 1 configured as described above, first, the radar apparatus 4 detects an object ahead. Then, when the radar apparatus 4 detects an object ahead and the collision avoidance apparatus 1 determines that the own vehicle is in a state in which collision can be avoided by steering, based on the estimated time to collision TTC and the own vehicle speed V (YES at step S60), the collision avoidance apparatus 1 changes the travelling direction of the own vehicle by steering to avoid collision between the object ahead and the own vehicle (step S100).

Furthermore, the collision avoidance apparatus 1 determines whether or not a corner is present ahead on the road on which the own vehicle is travelling (step S70). When determined that a corner is present, the collision avoidance apparatus 1 prohibits change in the travelling direction of the own vehicle by steering (step S80).

In this way, when determined that a corner is present ahead on the road on which the own vehicle is travelling, the collision avoidance apparatus 1 prohibits change in the travelling direction of the own vehicle performed to avoid collision with the object ahead. The own vehicle tends to more easily veer into the opposing lane as a result of the travelling direction of the own vehicle being changed to avoid collision with the object ahead when a corner is present ahead, compared to when a corner is not present ahead. Therefore, the collision avoidance apparatus 1 is able to suppress the occurrence of a situation in which the own vehicle veers into the opposing lane as a result of the travelling direction of the own vehicle being changed to avoid collision.

In addition, when the radar apparatus 4 detects an object ahead and the collision avoidance apparatus 1 determines that the own vehicle is in a state in which collision can be avoided by braking, based on the estimated time to collision TTC and the own vehicle speed V (YES at step S110), the collision avoidance apparatus 1 reduces the travelling speed of the own vehicle to avoid collision between the own vehicle and the object ahead (step S120). As a result, even when change in the travelling direction of the own vehicle is prohibited because a corner is present ahead on the road on which the own vehicle is travelling, the likelihood of a collision with the object ahead being avoided can be increased by the travelling speed of the own vehicle being reduced.

In addition, the collision avoidance apparatus 1 calculates the distance D until the own vehicle comes to a stop, based on the deceleration a0 when the travelling speed of the own vehicle is reduced by collision avoidance brake control and the current own vehicle speed v0, and determines whether or not a corner is present at a location that is ahead of the own vehicle by the distance D from the current position of the own vehicle. As a result, the collision avoidance apparatus 1 is able to suppress the occurrence of a situation in which the own vehicle has come to a stop while in a state in which the own vehicle has veered into the opposing lane as a result of the travelling direction of the own vehicle being changed to avoid collision.

In addition, when determined that the steering avoidance unsuitable condition that is set in advance to indicate that the state ahead on the road on which the own vehicle is travelling is not suitable for changing the travelling direction of the own vehicle by steering is established, the collision avoidance apparatus 1 prohibits changing of the travelling direction of the own vehicle by steering (step S90). As a result, the collision avoidance apparatus 1 is able to suppress the occurrence of a situation that is not suitable for the own vehicle as a result of the travelling direction of the own vehicle being changed to avoid collision.

According to the above-described embodiment, the radar apparatus 4 corresponds to detection means or a detector that detects an object ahead. The processes at steps S60 and S100 performed by the control unit 22 correspond to first collision avoidance means. The process at step S70 performed by the control unit 22 corresponds to corner determination means. The process at step S80 performed by the control unit 22 corresponds to first prohibition means.

In addition, the processes at steps S110 and S120 performed by the control unit 22 correspond to second collision avoidance means, and the process at step S90 performed by the control unit 22 corresponds to second prohibition means.
(Modifications of First Embodiment)

The first embodiment of the present disclosure is described above. However, the present disclosure is not limited to the above-described first embodiment, and various modifications of the first embodiment are possible so long as the modifications fall within the technical scope of the present disclosure.

Figure 7:
FIG. 7 is a diagram showing a structure of a corner determination table T1 according to one modification of the first embodiment.

For example, according to the above-described first embodiment, after the distance D over which the own vehicle moves until the own vehicle comes to a complete stop is calculated, whether or not a corner is present is determined by the road information of the road distance D [m] ahead being acquired from the navigation apparatus 5. However, as shown in FIG. 7, for example, a corner determination table T1 that indicates the correlation between distance and curvature within a distance range (5 m to 40 m in FIG. 7), set in advance, ahead on the road on which the own vehicle is travelling may be acquired in advance from the navigation apparatus 5, before the distance D is calculated. In other words, after the distance D is calculated, whether or not a corner is present at distance D ahead is determined by the corner determination table T1 being referenced.

As a result, the corner determination information indicating whether or not a corner is present is no longer required to be acquired after the distance D is calculated. The amount of time from when the distance D is calculated until whether or not a corner is present is determined can be shortened. Calculation load can be reduced as the distance interval (5 m in FIG. 7) included in the corner determination table T1 is increased. However, the accuracy of determination of whether or not a corner is present also decreases.

Figure 8:
FIG. 8 is a diagram showing a structure of a corner determination table T2 according to another modification of the first embodiment.

In addition, as shown in FIG. 8, a corner determination table T2 that indicates the correlation between distance and a corner determination flag within a distance range (5 m to 40 m in FIG. 8), set in advance, ahead on the road may be acquired instead of the corner determination table T1. When the corner determination flag is set to 1, a corner is present at the corresponding distance. Conversely, when the corner determination flag is set to 0, a corner is not present at the corresponding distance.

(Second Embodiment)

Next, a second embodiment will be described with reference to FIGS. 9 and 10. In the second embodiment, the components identical with or similar to those in the first embodiment are given the same reference numerals for the sake of omitting unnecessary explanation.

FIG. 9 shows a flowchart for a collision avoidance process performed by the control unit 22 according to the present embodiment. The flowchart shown in FIG. 9 includes a subroutine that is added between steps S80 and S90 shown in FIG. 2. When the determination at step S80 shown in FIG. 2 is NO, the control unit 22 performs the subroutine starting from step S201 shown in FIG. 9. Here, a predetermined variable (steer_avoid_judgecnt) used in the subroutine is initially set to 0 when an ignition switch (not shown) provided in the own vehicle is turned on.

At step S201, the control unit 22 calculates a stop distance L [m] required for the own vehicle in the current vehicle speed to stop at a predetermined deceleration G by the following expression (12):

$$t\_stop = vspd/\text{ACCELERATION}$$

$$L = vspd \times t\_stop - (\tfrac{1}{2}) \times \text{ACCELERATION} \times t\_stop^2 \quad (12)$$

where: t_stop is a time required for the own vehicle to stop [sec]; ACCELERATION is a deceleration G [m/s$^2$]; vspd is a vehicle speed [m/s] of the own vehicle; and L is a stop distance [m] over which the own vehicle moves till the own vehicle stops. The stop distance L is calculated by the above expression (12) that is one example. In other example (s), the stop distance L may be set using a map or a fixed value.

Next, at step S202, the control unit 22 determines whether or not a top of hill is present within the stop distance L ahead of the current position of the own vehicle, based on the road map data of the navigation apparatus 5. When the determination of step S202 is YES, it is possible to determine that the own vehicle does not detect a condition ahead of a top of hill using an autonomous sensor such as the radar apparatus 4. The autonomous sensor may include a laser radar (not shown) or an on-board camera (not shown) that is mounted to the own vehicle. In step S202, a top of hill may be assumed using an inflection point of a road in a vertical direction.

When it is determined that a top of hill is present within the stop distance L ahead of the current position of the own vehicle (YES at step S202), the control unit 22 sets the variable (steer_avoid_judgecnt) to 0 at step S203 (i.e., steer_avoid_judgecnt=0). The variable (steer_avoid_judgecnt) indicates the number of times where the determination at step S202 continuously becomes NO.

Next, at step S204, the control unit 22 sets a predetermined flag (steer_avoid_enable_flg) to OFF (i.e., steer_avoid_enable_flg=OFF). The flag (steer_avoid_enable_flg) is a flag that indicates a permission-prohibition state of steering avoidance (i.e., avoiding collision between the object ahead and the own vehicle by steering). As a result, when the flag is set to OFF, the control unit 22 is prohibited from performing steering avoidance to avoid collision between the object ahead and the own vehicle by steering.

On the other hand, when it is determined that a top of hill is present within the stop distance L ahead of the current position of the own vehicle (NO at step S202), the control unit 22 increments the variable (steer_avoid_judgecnt) by 1 (i.e., steer_avoid_judgecnt=steer_avoid_judgecnt+1).

Next, at step S206, the control unit 22 judges whether or not the variable (steer_avoid_judgecnt) is equal to or larger than a predetermined threshold value (JUDGEVALUE) (i.e., steer_avoid_judgecnt≥JUDGEVALUE). The threshold value (JUDGEVALUE) is a variable that indicates the number of times where the determination at step S202 continuously becomes NO in which steering avoidance is permitted. That is, in the process at step S206, the control unit 22 judges the number of times where the determination at step S202 continuously becomes NO. In other words, the control unit 22 judges whether or not a state, where a top of hill is not present within the stop distance L ahead of the current position of the own vehicle, continues for a predetermined time or more.

If a permission-prohibition state of steering avoidance is determined based on one determination of YES or NO at step S202, a permission-prohibition state may be frequently changed. For example, when a distance between the own vehicle and a top of hill is close to the stop distance L, values detected by an on-board sensor that detects the position of the own vehicle, such as the navigation apparatus 5, fluctuate due to noises or the like. Due to this fluctuation of detected values, a distance between the own vehicle and a top of hill varies, so that the determination at S202 is frequently changed. According to the process at step S206, it is possible to suppress an occurrence of a situation in which a permission-prohibition state of steering avoidance is frequently changed.

Subsequently, at step S207, the control unit 22 sets the flag (steer_avoid_enable_flg) to ON (i.e., steer_avoid_enable_flg=ON). As a result, when the flag is set to ON, the control unit 22 is permitted to perform steering avoidance to avoid collision between the object ahead and the own vehicle by steering.

According to the collision avoidance apparatus 1 of the present embodiment, when a top of hill is present ahead on the road on which the own vehicle is travelling (YES at step S202), changing of the travelling direction of the own vehicle to avoid collision with an object ahead is prohibited (step S204).

The own vehicle tends to more easily veer into an opposing lane as a result of the travelling direction of the own vehicle being changed to avoid collision with an object ahead when a top oh hill is present ahead, compared to when a top oh hill is not present ahead. Therefore, in the collision avoidance apparatus 1 of the present second embodiment, the occurrence of a situation in which the own vehicle veers into an opposing lane as a result of the travelling direction of the own vehicle being changed to avoid collision can be suppressed.

(Modifications of Second Embodiment)

The second embodiment of the present disclosure is described above. However, the present disclosure is not limited to the above-described second embodiment, and various modifications of the second embodiment are possible so long as the modifications fall within the technical scope of the present disclosure.

For example, at step S202, the control unit 22 may determine whether or not a top of hill is present within the stop distance L ahead of the current position of the own vehicle, based on a camera image acquired by an on-board camera (not shown). For example, first, the control unit 22 detects a boundary (road boundary) of a road on which the own vehicle is travelling in the acquired camera image. The road boundary is present right and left, as viewed from the own vehicle. Next, when a boundary line between the road and a background other than the road in an approximately horizontal direction between right and left road boundaries is detected, the control unit 22 determines that a top of hill is present at the detected boundary line between the road and the background other than the road.

FIG. 10 shows one example in the above modification. As shown in FIG. 10, the control unit 22 detects whether or not a boundary line between a road and a background other than the road in an approximately horizontal direction between right and left road boundaries, by performing image processing such as Hough transformation or other known feature extraction technique(s) with respect the camera image. As a result, when it is detected that a boundary line between a road and a background other than the road in an approximately horizontal direction between right and left road boundaries, the control unit 22 determines that a condition ahead of a road cannot be not detected. In this case, the control unit 22 may detect a top of hill is present at the detected boundary line between the road and the background other than the road.

In another example in the above modification, the control unit 22 detects whether or not an uphill area (upward slope) is present ahead of the own vehicle, based on the road map data of the navigation apparatus 5. When it is detected that an uphill area is present ahead of the own vehicle, the control unit 22 may determine that there is a probability that a condition ahead of the detected uphill area cannot be not detected by the autonomous sensor such as the radar apparatus 4, a laser radar (not shown), or an on-board camera (not shown). In this case, the control unit 22 may detect a top of hill is present ahead of the own vehicle.

Regarding permission and prohibition of steering avoidance, when it is detected that: (i) the own vehicle is travelling on an uphill area with a predetermined gradient or more; or (ii) an uphill area with a predetermined gradient (slope) or more is present ahead of the own vehicle, the control unit 22 may prohibit steering avoidance. For example, in a case where a brake control amount and a steering control amount are calculated such that a desired deceleration and a desired lateral acceleration are output, the control unit 22 may set to calculate a brake control amount and a steering control amount on the assumption that a road on which the own vehicle is travelling is flat, in order to simplify a process of calculating.

In this case, even when detected that (i) the own vehicle is travelling on an uphill area with a predetermined gradient or more; or (ii) an uphill area with a predetermined gradient or more is present ahead of the own vehicle, a brake control amount and a steering control amount are calculated on the assumption that a road on which the own vehicle is travelling is flat. As a result, the own vehicle stops at a position before a predetermined stop position. Here, as the gradient of the uphill area becomes steeper, collision with an object ahead can be more surely avoided by only braking control and therefore, steering control becomes more unnecessary.

Thus, in the collision avoidance apparatus using the control unit 22 set as described above, when detected that: (i) the own vehicle is travelling on an uphill area with a predetermined gradient or more; or (ii) an uphill area with a predetermined gradient (slope) or more is present ahead of the own vehicle, the control unit 22 prohibits steering avoidance, thereby being cable to reduce unnecessary steering avoidance.

What is claimed is:

1. A collision avoidance apparatus that is mounted to an own vehicle and which controls the own vehicle to avoid collision with an object that is present ahead of the own vehicle and detected by a detector that is mounted to the own vehicle and detects the object ahead of the own vehicle, the collision avoidance apparatus comprising:
   a control unit, including a microcomputer, that is connected to the detector and configured to perform a collision avoidance process,
   the collision avoidance process comprising:
      determining whether or not the object is present ahead of the own vehicle;
      when the control unit determines that the object ahead is present, determining whether or not the own vehicle will have a collision between the object ahead and the own vehicle and whether or not a corner is present ahead of the own vehicle; and
      when the control unit determines that the corner is not present and when a predetermined collision avoidance condition is established, changing a travelling direction of the own vehicle to avoid collision between the object ahead and the own vehicle, the predetermined collision avoidance condition indicating that the own vehicle is in a state in which the travelling direction of the own vehicle is required to be changed, wherein when the control unit determines that the corner is present, the control unit does not perform a travelling direction change of the own vehicle by steering.

2. The collision avoidance apparatus according to claim 1, wherein:
the predetermined collision avoidance condition is a predetermined first collision avoidance condition; and
the collision avoidance process further comprises
when the detector detects the object ahead and when a predetermined second collision avoidance condition is established, reducing a travelling speed of the own vehicle to avoid collision between the own vehicle and the object ahead, the second collision avoidance condition indicating that the own vehicle is in a state in which the own vehicle is required to be braked.

3. The collision avoidance apparatus according to claim 2, wherein
the collision avoidance process further comprises
calculating a stop distance over which the own vehicle moves until the own vehicle stops, based on a vehicle speed of the own vehicle and a deceleration of the own vehicle when the own vehicle is braked; and
determining whether or not the corner is present at a position which is apart from a current position of the own vehicle forward by the stop distance.

4. The collision avoidance apparatus according to claim 3, wherein
the collision avoidance process further comprises
before the stop distance is calculated, acquiring in advance corner determination information indicating whether or not the corner is present on a road within a predetermined distance range ahead of a road on which the own vehicle is travelling.

5. The collision avoidance apparatus according to claim 1, wherein:
the collision avoidance process further comprises
when a predetermined prohibiting condition is established, prohibiting the control unit from changing the travelling direction of the own vehicle to avoid collision between the object ahead and the own vehicle, the prohibiting condition indicating that a state ahead on a road on which the own vehicle is travelling is not suitable for changing the travelling direction of the own vehicle.

6. The collision avoidance apparatus according to claim 2, wherein:
the collision avoidance process further comprises
when a predetermined prohibiting condition is established, prohibiting the control unit from changing the travelling direction of the own vehicle to avoid collision between the object ahead and the own vehicle, the prohibiting condition indicating that a state ahead on a road on which the own vehicle is travelling is not suitable for changing the travelling direction of the own vehicle.

7. The collision avoidance apparatus according to claim 3, wherein:
the collision avoidance process further comprises
when a predetermined prohibiting condition is established, prohibiting the control unit from changing the travelling direction of the own vehicle to avoid collision between the object ahead and the own vehicle, the prohibiting condition indicating that a state ahead on a road on which the own vehicle is travelling is not suitable for changing the travelling direction of the own vehicle.

8. The collision avoidance apparatus according to claim 4, wherein:
the collision avoidance process further comprises
when a predetermined prohibiting condition is established, prohibiting the control unit from changing the travelling direction of the own vehicle to avoid collision between the object ahead and the own vehicle, the prohibiting condition indicating that a state ahead on a road on which the own vehicle is travelling is not suitable for changing the travelling direction of the own vehicle.

9. A collision avoidance method comprising:
detecting an object ahead;
when the object ahead is detected, changing, by a collision avoidance apparatus, a travelling direction of an own vehicle to avoid collision between the object ahead and the own vehicle, determining whether or not a corner is present ahead on a road on which the own vehicle is travelling if a predetermined collision avoidance condition is established; and
when it is determined that the corner is present, prohibiting the collision avoidance apparatus from changing the travelling direction of the own vehicle.

10. A collision avoidance apparatus that is mounted to an own vehicle and which controls the own vehicle to avoid collision with an object that is present ahead of the own vehicle and detected by a detector that is mounted to the own vehicle and detects the object ahead, the collision avoidance apparatus comprising:
a control unit, including a microcomputer, that is connected to the detector and configured to perform a collision avoidance process,
the collision avoidance process comprising:
determining whether or not the object is present ahead of the own vehicle;
when the control unit determines that the object ahead is present, determining whether or not the own vehicle will have a collision between the object ahead and the own vehicle and whether or not a top of a hill is present ahead of the own vehicle; and
when the control unit determines that the top of the hill is not present and when a predetermined collision avoidance condition is established, changing a travelling direction of the own vehicle to avoid a collision between the object ahead and the own vehicle, the predetermined collision avoidance condition indicating that the own vehicle is in a state in which the travelling direction of the own vehicle is required to be changed, wherein
when the control unit determines that the top of the hill is present, the control unit does not perform the travelling direction change of the own vehicle by steering to avoid the collision with the object ahead, behind the top of the hill, and that is not visible.

11. A collision avoidance method comprising:
detecting an object ahead;
when the object ahead is detected, changing, by a collision avoidance apparatus, a travelling direction of an own vehicle to avoid collision between the object ahead and the own vehicle, determining whether or not a top of a hill is present ahead on a road on which the own vehicle is travelling if a predetermined collision avoidance condition is established; and
when it is determined that a top of a hill is present, prohibiting the collision avoidance apparatus from changing the travelling direction of the own vehicle by steering to avoid a collision with the object present ahead, behind the top of the hill, and that is not visible.

* * * * *